Jan. 3, 1933.    L. M. PATTERSON, JR    1,892,962
STORAGE BATTERY
Filed April 23, 1929
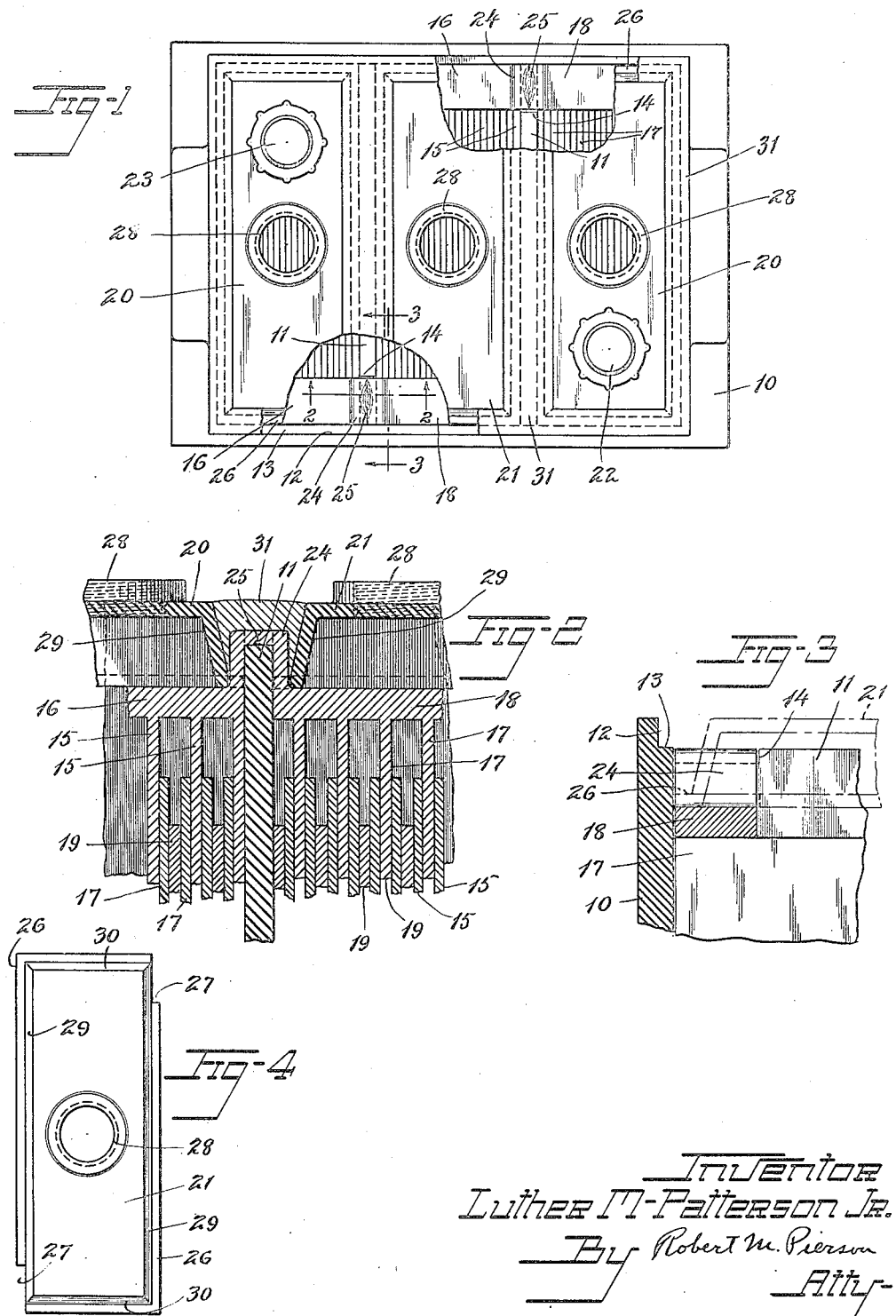

Patented Jan. 3, 1933

1,892,962

UNITED STATES PATENT OFFICE

LUTHER M. PATTERSON, JR., OF NEW PHILADELPHIA, OHIO

STORAGE BATTERY

Application filed April 23, 1929. Serial No. 357,385.

This invention relates to storage batteries of the type employing a unitary container with individual cell covers and inter-cell conductors buried under the plastic material which seals said covers.

My object is to provide an inter-cell connection which is permanently leak-proof, without the use of prior expedients which are more or less unsatisfactory and add to the cost of manufacture, such as compressible packings or conductors bolted to or molded in the partitions.

Of the accompanying drawing, Fig. 1 is a top plan view, partly broken away, showing a three-cell storage battery embodying my improvements.

Fig. 2 is a partial vertical section thereof, on a larger scale, taken on the line 2—2 of Fig. 1.

Fig. 3 is a vertical section on the line 3—3 of Fig. 1, omitting the sealing compound and showing one of the cell covers in broken lines.

Fig. 4 is a top plan view of the intermediate cell cover.

In the drawing, 10 is a container of unitary or one-piece construction adapted to be made of a moldable insulating and acid-proof material such as hard rubber, asphalt composition or the like, and having two transverse partitions 11 integral with the side and bottom walls and dividing its interior into three compartments. The walls of this container are recessed all around, on the inner sides of their upper edge portions, as indicated at 12, with a shoulder 13 at the bottom of the recess, and the partitions 11 terminate at their upper edges at the level of shoulder 13, short of the upper edges of the outer walls of the container. Each partition 11 is notched on its upper edge at 14 at one end thereof, the two notches being rectangular in shape and located adjacent the diagonally-opposite corners of the middle cell.

Each cell contains the usual group of active lead plates and separators adapted to be immersed in electrolyte, 15, 15, for example, being the positive plates connected in parallel by a conductive strap, bar or crowfoot 16; 17, 17 being the negative plates connected in parallel by a similar strap or bar 18, and 19 being the separators.

20, 20 are the individual cell covers for the two end cells, and 21 is a similar cover for the middle cell, these covers being upwardly dished or concave and made of moldable, insulating material such as hard rubber. The positive and negative terminals or posts 22, 23 of the battery are respectively carried upwardly through apertures in the end cell covers 20 in the usual manner, and located at diagonally opposite corners of the battery for connection with the external circuit. The inter-cell connections, however, are made below the level of the tops of the covers 20 and adapted to be embedded in the sealing compound, so that they do not appear above the surface of the battery when the latter is complete. Thus I make these inter-cell connections from the plates of one sign in one cell to those of the opposite sign in an adjoining cell by means of yokes or inverted U-shaped conductors 24 straddling the upper edges of the partitions 11 and occupying the respective notches 14. The L-shaped halves of these conductors are respectively cast on the ends of the bars 16 and 18; and after the plates have been assembled in the cells and the horizontal or overhanging legs of the conductor halves or members let down into the notches 14 from above, the ends of said halves are burned or soldered together at 25 over the partitions 11. It is important that the partitions 11 shall be solid and impervious as distinguished from double or laminated walls of adjacent, separately-formed, individual cell jars, in order to avoid loss of electrolyte between cells, due to siphoning or capillary action under the inter-cell connectors.

The cell covers are formed with horizontal base flanges 26 located wholly below the notches 14, and said flanges are interrupted or notched adjacent one corner of the cell cover as indicated at 27 to accommodate the partition-straddling conductors 24, the middle cover 21 having two of these notches at diagonally-opposite points as indicated in Fig. 4 and the end covers 20 each having one such notch. 28 is the usual filling and vent aperture formed in a central, upwardly-projecting flange in the middle of each cell cover and adapted to be closed with the usual vented screw plug (not shown).

The cell covers 20 and 21 may rest at their lower edges on or near the bars 16, 18, and their base flanges 26 are closely fitted within the walls of the individual cells. Said base flanges and the sloping side and end walls 29, 30 of said covers, together with the adjacent cell walls, form a receptacle or series of connected grooves for the reception of sealing compound 31 which is melted and poured into said grooves after the other parts are assembled. Said compound performs the usual function of sealing the joints between the covers and walls of the container. In addition, in my present invention, this sealing material in the intermediate transverse grooves embeds or buries the inter-cell connectors 24.

By reason of this improved construction and combination of features, the amount of lead required for each battery is considerably reduced, the length and electrical resistance of the inter-cell conductors are diminished, a smaller number of operations is required in assembling the battery and making the inter-cell connections, the top of the battery presents a neater appearance and may more readily be wiped clean and dry, there is less opportunity for escape of electrolyte and less liability to short-circuiting due to exposure of conductors. If desired, any individual cell can be opened for repairs without opening the others and repairs can be more quickly effected, while the sealing is effectively performed in the usual manner, by methods familiar to the workmen in service stations. For testing the voltage of an individual cell, the buried inter-cell connector can readily be reached by the pointed prong of a battery-testing voltmeter, piercing the sealing compound.

It will be seen from Figs. 1, 2 and 3 that the legs of each conductor 24 closely embrace the opposite faces of the partition 11, and that the connecting portion of said conductor in the notch 14 has a close but non-sealing fit in said notch, so that the plates are anchored against movement both longitudinally and transversely of the partition. Accordingly, in applying the plastic material 31, which in common practice is heated to a point where it flows but is not so thin that it can escape into the cell chambers through the crevices between the edges of the covers and the container, said material will be excluded from entering, to any substantial extent, the crevices between the legs of the conductor and the partition and between the connecting portion of said partition and the end walls of the notch or under said connecting portion. Instead, the plastic material bridges over these crevices and appears to form an air-pocket including the crevices, notwithstanding which, the inter-cell conductor channel is completely sealed solely by means of said plastic material, apparently because the shape of the air-pocket prevents the action of capillarity from causing seepage through the channel which would short-circuit the electrolyte between cells. The joint remains permanently sealed because the conductor is held against movement by the partition sides and the notch walls.

I claim:

1. A storage battery comprising a unitary cellular container including an impervious inter-cell partition having a depressed upper edge and preformed with a conductor-receiving notch, plates in the cells, a U-shaped, inter-cell, plate-connecting conductor including portions substantially in non-sealing contact with the container portions defining the notch and with adjacent side portions of the partition for mechanically anchoring the conductor against horizontal movement in all directions, individual cell covers having the upper sides of the edges thereof wholly below the notch, and cover-sealing plastic material overlying the partition and conductor and forming therewith a permanently sealed inter-cell joint.

2. A storage battery comprising a unitary cellular container having an impervious partition between cells, said partition having a depressed upper edge and being preformed with a plate-anchoring notch, individual cell covers located wholly below said notch, forming with the container an upwardly-exposed sealing receptacle embracing the upper edge of said partition, plates in the cells, an inter-cell plate-connecting conductor having a U-portion in said receptacle including legs substantially in contact with the sides of the partition and a connecting portion contained mainly within said notch and substantially in non-sealing contact with the container portions defining the notch, whereby the plates are anchored against movement both longitudinally and transversely of the partition, and cover-sealing plastic material in said receptacle, overlying the partition and conductor and forming the sole means for sealing the conductor, said material bridging but not substantially penetrating the crevices between said conductor and the container.

In witness whereof I have hereunto set my hand this 19th day of April, 1929.

LUTHER M. PATTERSON, Jr.